(12) United States Patent
Willhite et al.

(10) Patent No.: US 7,352,699 B2
(45) Date of Patent: Apr. 1, 2008

(54) SWITCH FABRIC ACCESS SCHEDULER

(75) Inventors: Nelson Willhite, Sunnyvale, CA (US); Mike Noll, San Jose, CA (US); Robert Steven Martin, Los Gatos, CA (US); Akhil Duggal, Los Altos, CA (US); Craig Lindberg, Nevada City, CA (US); Thomas Carleton Jones, San Jose, CA (US); Srinivas Komidi, Cupertino, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 17 days.

(21) Appl. No.: 10/740,720

(22) Filed: Dec. 18, 2003

(65) Prior Publication Data
US 2004/0213261 A1 Oct. 28, 2004

Related U.S. Application Data

(60) Provisional application No. 60/465,654, filed on Apr. 25, 2003.

(51) Int. Cl.
*G08C 15/00* (2006.01)

(52) U.S. Cl. .............................. 370/230.1; 370/395.41; 370/412

(58) Field of Classification Search ................ 370/230, 370/230.1, 231, 232, 235, 235.1, 395.41–395.43, 370/412, 542
See application file for complete search history.

(56) References Cited

U.S. PATENT DOCUMENTS

| | | | | |
|---|---|---|---|---|
| 5,528,584 A | * | 6/1996 | Grant et al. ................ | 370/254 |
| 5,751,709 A | * | 5/1998 | Rathnavelu ............. | 370/395.4 |
| 5,862,137 A | * | 1/1999 | Manning et al. ....... | 370/395.41 |
| 5,936,958 A | * | 8/1999 | Soumiya et al. ....... | 370/395.43 |
| 6,424,622 B1 | * | 7/2002 | Fan et al. ................... | 370/230 |
| 6,434,160 B1 | * | 8/2002 | Davis ......................... | 370/412 |
| 6,628,668 B1 | * | 9/2003 | Hutzli et al. ................ | 370/468 |
| 6,647,011 B1 | * | 11/2003 | Zhou et al. ........... | 370/395.41 |
| 6,882,625 B2 | * | 4/2005 | Le et al. ..................... | 370/238 |
| 6,937,601 B2 | * | 8/2005 | Kim ....................... | 370/395.41 |

FOREIGN PATENT DOCUMENTS

| EP | 1009189 A2 | * | 6/2000 |
|---|---|---|---|
| EP | 1037398 A2 | * | 9/2000 |

OTHER PUBLICATIONS

Stiliadis, D. et al., "Rate-Proportional Servers: A Design Methodology for Fair Queueing Algorithms," IEEE/ACM Transactions on Networking, vol. 6, Issue 2, Apr. 1998. pp. 164-174.*

Cobb, J.A. et al., "Time-Shift Scheduling-Fair Scheduling of Flows in High-Speed Networks," IEEE/ACM Transactions on Networking, vol. 6, Issue 3, Jun. 1998. pp. 274-285.*

* cited by examiner

*Primary Examiner*—Chi Pham
*Assistant Examiner*—Donald L Mills
(74) *Attorney, Agent, or Firm*—Van Pelt, Yi & James LLP (57) ABSTRACT

A technique for providing access to a switch fabric is disclosed. In some embodiments, the method comprises determining scheduling information specific to a link to the switch fabric and using the scheduling information to determine a queue to be serviced by the link. In some embodiments, the system comprises a buffer configured to store a plurality of queues, and a queue scheduler associated with the buffer and configured to determine scheduling information specific to a link to the switch fabric and use the scheduling information to select one of the plurality of queues as the next queue to be serviced by the link.

17 Claims, 7 Drawing Sheets

SWITCH FABRIC ACCESS SCHEDULER

CROSS REFERENCE TO RELATED APPLICATIONS

This application claims priority to U.S. Provisional Patent Application No. 60/465,654 entitled An Improved Network Switch Fabric Access Integrated Circuit filed Apr. 25, 2003, which is incorporated herein by reference for all purposes.

FIELD OF THE INVENTION

The present invention relates generally to networking systems. More specifically, a technique for accessing a switch fabric is disclosed.

BACKGROUND OF THE INVENTION

In a packet switched communication system such as a router, a switch or other appropriate networking devices, there is often a need to exchange data between the network and the switch fabric of the system. Typically, data received from the network is buffered in a number of queues. A queue scheduler determines the order in which the queues are to be serviced. Data in a queue scheduled to be serviced are sent to one or more links associated with a switch fabric. In some cases, the queue scheduler uses a round robin (RR) scheme that gives each of the queues equal opportunity to be serviced. In some cases, in order to control the quality of service (QOS) and groom traffic, the queue scheduler uses a weighted round robin (WRR) scheme that services the queues with different priority levels.

Although the weighted round robin scheduler offers good grooming of the source traffic when the switch fabric receiving the traffic data has no congestion, problems may arise when the switch fabric experiences congestion. Upon detecting heavy traffic on any of its links, the switch fabric sends back congestion signals indicating that traffic to the congested links should be reduced. The queue scheduler typically reduces traffic by not servicing the queues associated with the congested links; however, this may cause queue starvation and interruption of the expected grooming. As a result, the service quality of time sensitive applications such as audio/video streaming and voice over IP may be degraded. It would be desirable to have a technique that would prevent the queue starvation problem and ameliorate the interruption to traffic grooming when there is high volume of traffic on one or more links.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

A technique for providing switch fabric access is disclosed. In some embodiments, a queue to be serviced by a link to the switch fabric is determined using link-specific scheduling information. In some embodiments, a dual mode queue scheduler is used to schedule queues. In a first scheduling mode, scheduling data that is not specific to a link is used to determine the queue to be serviced. In a second scheduling mode, scheduling data specific to the link is used to determine the queue to be serviced. The scheduling data used may comprise one or more state variables, such as index and round variables such as may be used in a weighted round robin scheme. In some embodiments, sets of scheduling data are arranged in a ring and a scheduler reads the scheduling data from a prescribed position in the ring. In the first mode, the ring remains stationary and only one set of variables, in that mode not specific to any one link, is used. In a second mode, the ring is rotated with each scheduling decision, and a different set of scheduling information, each set specific to a particular link is stored in each position in the ring.

Figure 1:
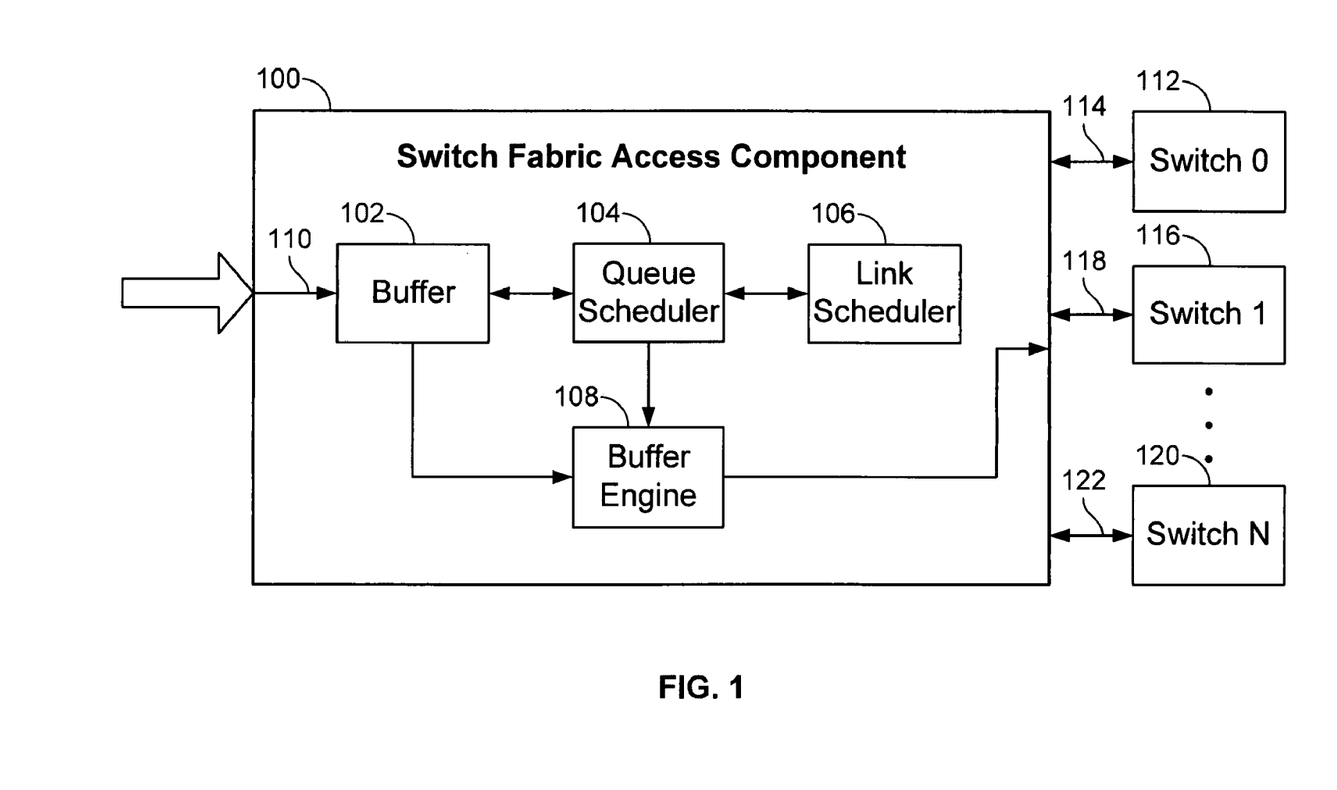
FIG. 1 is a block diagram illustrating a switch fabric access component according to one embodiment.

FIG. 1 is a block diagram illustrating a switch fabric access component according to one embodiment. In this example, a switch fabric access component 100 includes a buffer 102, a queue scheduler 104, a link scheduler 106, and a buffer engine 108. The switch fabric access component may be implemented as an integrated circuit, a programmable array, a software process or firmware code running on a processor, or any other appropriate software/hardware combination. In some embodiments, a striped switch fabric is employed where the packets are divided into fixed sized cells that are stored in the buffer queues and sent into the switch fabric in parallel over a plurality of serial links to the switch fabric. In some embodiments, a non-striped switch fabric is employed and the packets are not divided into cells and sent into the switch fabric in parallel over a plurality of serial links. The techniques described herein are applicable to both striped and non-striped architectures.

In the embodiment illustrated in FIG. 1, data packets received on input interface 110 are sent to buffer 102, which stores the data packets in multiple queues. In some embodiments, the assignment to queues is based on data included in a received packet, such as data associated with a particular sender or service. The data in the buffer may be transferred as described below via links 114, 118 and 122 to switches 112, 116 and 120, respectively. The switches comprise a network switch fabric to which the switch fabric access component 100 is configured to provide access. Other embodiments may have more or fewer switch elements comprising the switch fabric. As used herein, a switch fabric refers to a component or set of components used to make connections between inputs and outputs. The numbers of switches and links are implementation dependent. In some embodiments, a single component, such as a single integrated circuit, may comprise multiple switch elements and multiple links may transfer data to a single switch fabric component. Link scheduler 106 determines which link should be used to transfer data next. Link scheduler 106 may use RR or WRR schemes as well as any other appropriate technique for scheduling links. Link scheduler 106 notifies queue scheduler 104 once the scheduled link becomes available so that the queue scheduler may determine a queue to be serviced by that link. Details of the queue scheduler are discussed below. Buffer engine 108 then retrieves data from the scheduled queue and sends the data to the available link. The amount of data to be retrieved from the scheduled queue depends on implementation. For example, in some striped systems, the buffer engine retrieves a cell fragment from the scheduled queue and sends it to the link; in some non-striped systems, the buffer engine retrieves an entire cell from the scheduled queue and sends the cell to the link. The buffer engine may be implemented as a separate component or functional block, or as part of one of the schedulers.

In some embodiments, queue scheduler 104 may implement a single scheduling process used to schedule queues to be serviced by one or more links. As used herein, a scheduling process refers to a process used to determine the next queue to be serviced. It may be implemented in any appropriate manner, including being built into a logic circuit, being embedded in a chip, being loaded into memory or firmware, or combinations thereof. In some embodiments, queue scheduler 104 implements multiple scheduling processes. In some such embodiments, each scheduling process corresponds to a link to the switch fabric, and the scheduling process is responsible for scheduling a queue to send data to its corresponding link. The individual scheduling processes may employ techniques such as round robin, weighted round robin, or any other appropriate techniques to accomplish scheduling.

Figure 2A:
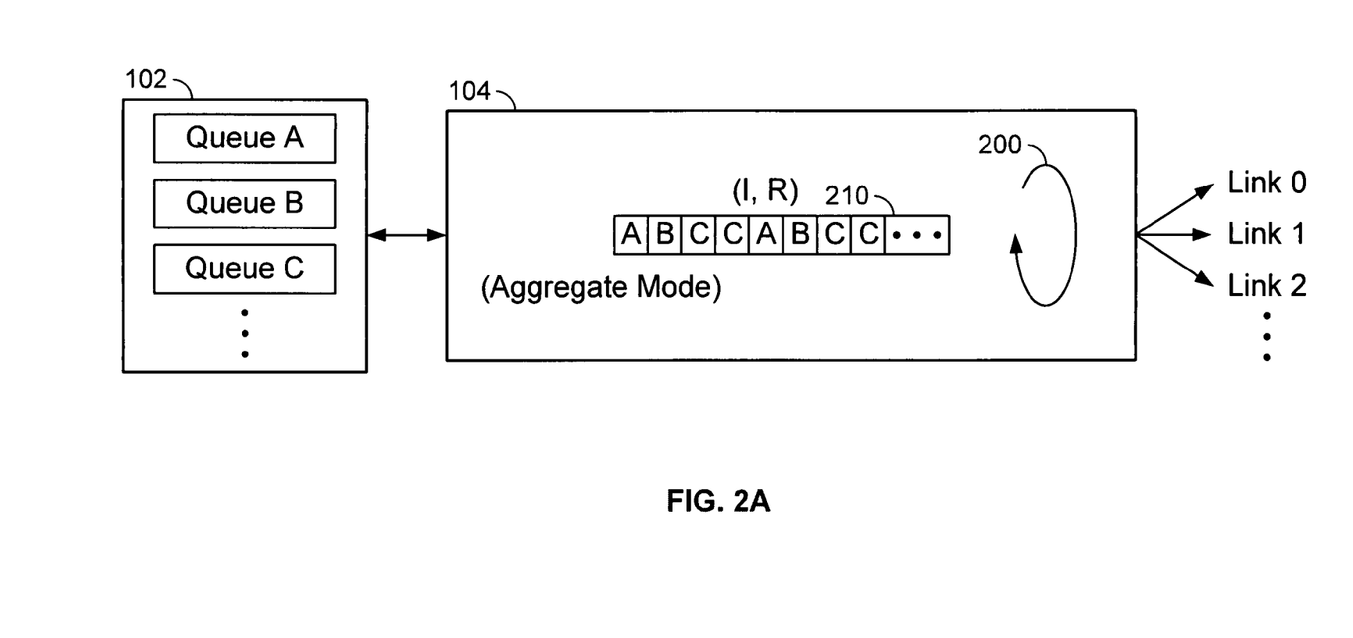
FIG. 2A is a block diagram illustrating a switch fabric access component with a queue scheduler operating in aggregate mode according to one embodiment.

FIG. 2A is a block diagram illustrating a switch fabric access component with a queue scheduler operating in aggregate mode according to one embodiment. In this example, buffer 102 maintains a set of queues such as queues A, B, and C. The number of queues maintained in the buffer is implementation dependent and may vary for different embodiments. Queue scheduler 104, which is operating in aggregate mode in this example, includes one scheduling process 200. In some embodiments, the scheduling process determines the next queue to be serviced based on certain scheduling information. For example, in a WRR scheduling process, the scheduling information includes state variables I and R, representing the index variable and the round variable, respectively. Although the examples in this specification discuss extensively the use of WRR scheduling scheme and state variables I and R, other scheduling schemes such as weighted fair queueing (WFQ), deficit round robin (DRR), strict priority (SP), round robin (RR), etc., and the corresponding variables may also be used.

In the example shown in FIG. 2A, the order in which the queues are serviced is shown in a queue selection sequence 210. Each time a queue is serviced, available data from this queue is sent to the next available link. In aggregate mode, the scheduling information used to determine which queue should be serviced is not link specific. The same set of state variables I and R are used for all the links, although the values may change during scheduling. Note that while in FIG. 2A the data is shown for purposes of illustration and simplicity to flow from the queue scheduler to the links, in some embodiment a separate buffer engine, such as the buffer engine 108 of FIG. 1, is provided to read data from the scheduled queue and provide the read data to the corresponding link.

Figure 2B:
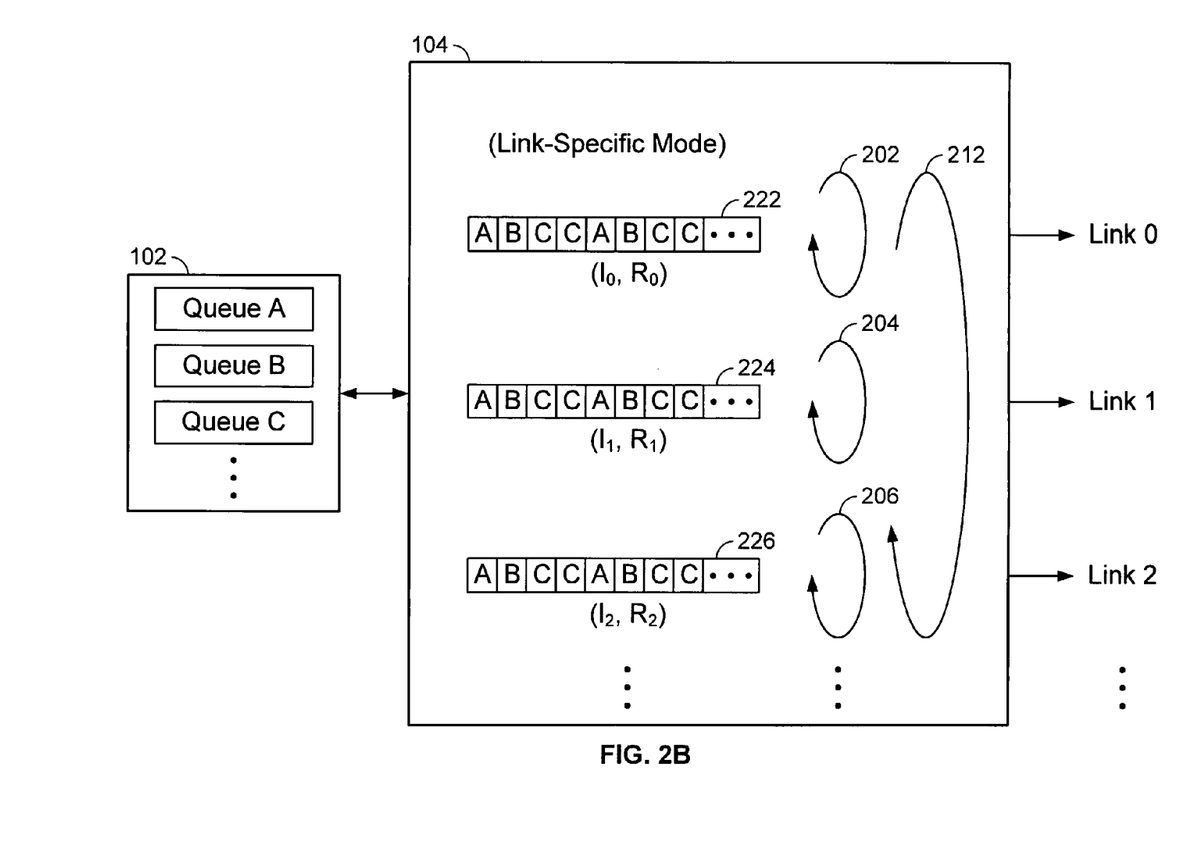
FIG. 2B is a diagram illustrating a switch fabric access component with a queue scheduler operating in link-specific mode according to one embodiment.

FIG. 2B is a diagram illustrating a switch fabric access component with a queue scheduler operating in link-specific mode according to one embodiment. In link-specific mode, scheduling information specific to a link is used to perform queue scheduling for the link. In this example, a single queue scheduler 104 implements multiple scheduling processes. Scheduling processes 202, 204, 206 correspond to links 0, 1 and 2, respectively. The scheduling processes run in parallel in this case. The separate link-specific scheduling processes may be implemented using a single queue scheduler, as opposed to a separate scheduler for each link, through time sharing techniques, as described more fully below. The scheduling process may also be implemented using multiple queue schedulers.

To determine the next queue to be serviced, a selection scheduler 212 selects an appropriate scheduling process among the multiple scheduling processes. In some embodiments, the selection scheduler is a round robin scheduler that sequentially selects the scheduling processes. In some embodiments, the selection scheduler is responsive to an input received from a link scheduler, such as the link scheduler 106 of FIG. 1, and selects the scheduling process that corresponds to the link identified by the link scheduler as the next link to be scheduled. In some embodiments, the link scheduler selects the scheduling process directly. The scheduling processes such as 202, 204, 206 each have their own set of state variables $(I_0, R_0)$, $(I_1, R_1)$, $(I_2, R_2)$, respectively. Like their corresponding scheduling processes, these state variables are link specific. For example, each time scheduling process 202 is scheduled to run, its corresponding state variables $I_0$ and $R_0$ are used to select a queue and their values are updated. Accordingly, a queue selection sequence 222 can be obtained for link 0, in which every selection in the sequence (A, B, C, etc.) is determined based on the state variable values at the time the selection is made. Similarly, scheduling process 204 and its corresponding state variables, $I_1$ and $R_1$, provide link 1 with a selection sequence 224, and scheduling process 206 uses its corresponding state variables $I_2$ and $R_2$ to provide a selection sequence 226 for link 2.

In this example, when congestion is present on a link to the switch fabric, that link may not be available to service queues affected by the congestion for a time. In some embodiments, if a link is experiencing congestion with respect to one or more queues, the scheduling process for that link is configured to continue to service queues not affected by the congestion. The scheduling processes for non-congested links operate according to their scheduling sequence as usual and the queues are serviced with approximately the same frequency as before, thus the quality of service and desired traffic grooming effects are maintained. In addition, when a single set of scheduling variables is used, as described above in connection with FIG. 2A, certain rhythmic traffic and congestion patterns may result in a particular queue not being serviced for an unacceptable interval. Providing a separate scheduling process for each link as illustrated in FIG. 2B may avoid such rhythmic patterns from resulting in undesired queue "starvation".

In some embodiments, the queue scheduler is a dual mode scheduler that supports both the aggregate mode and the link-specific mode. The dual mode scheduler may be configurable to switch between the modes manually or automatically. For example, a command line user interface or graphic user interface may be provided to an operator, who can switch between operational modes based on observation of traffic patterns and conditions. In some embodiments, certain predetermined criteria may be used to determine which of the modes is more suitable for current traffic conditions and automate the mode selection. For example, the difference between the desired frequency of service for each queue and the actual frequency of service may be compared with a preset value. A difference greater than the preset value would indicate that some queues may be starved and the queue scheduler may switch from aggregate mode to link-specific mode. Later, when the congestion on the link eases, queue scheduler 104 may switch back to aggregate mode from link-specific mode since data transferred in aggregate mode can have characteristics that may be more desirable, such as lower "jitter".

Figure 3:
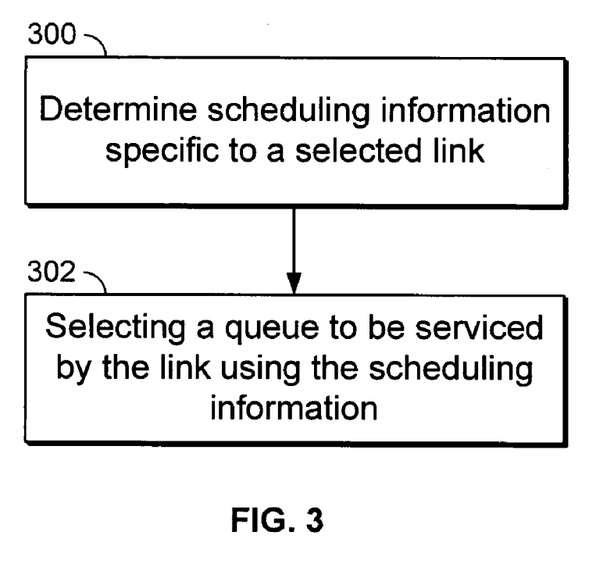
FIG. 3 is a flowchart illustrating a queue selection process in link specific mode according to one embodiment.

FIG. 3 is a flowchart illustrating a queue selection process in link specific mode according to one embodiment. The scheduling information specific to a selected link is determined (300). A queue to be serviced by the link is then selected using the scheduling information (302). For example, once the link specific scheduling information, such as the values for the state variables $I_0$, $R_0$, if link 0 is being scheduled are determined (300), the corresponding scheduling process can select the queue to be serviced by the link based on the state variables (302).

Figure 4:
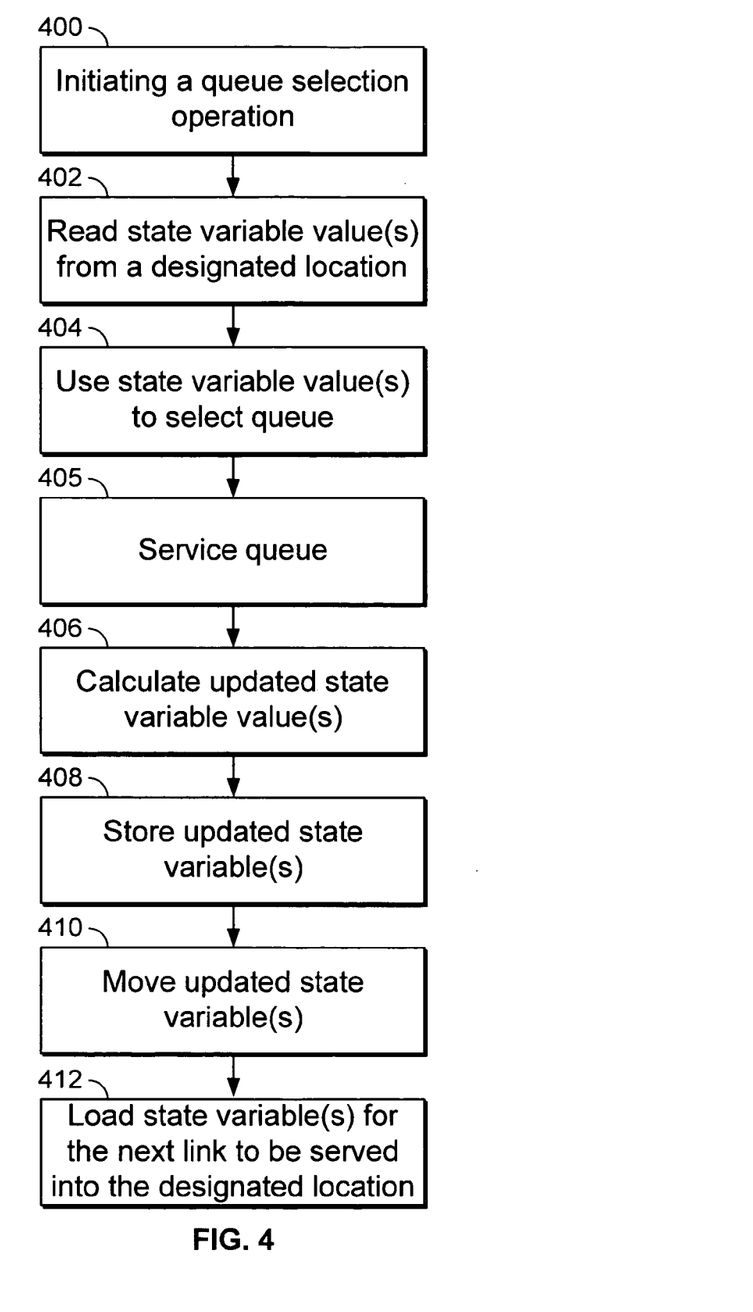
FIG. 4 is a flowchart illustrating the queue scheduler operation in a link specific mode according to another embodiment.

FIG. 4 is a flowchart illustrating the queue scheduler operation in a link specific mode according to another embodiment. In this embodiment, a queue selection operation is initiated (400). For example, a link scheduler such as 106 of FIG. 1 may determine that a link is available and notifies the queue scheduler to initiate the queue selection operation. One or more state variables are read from a designated location (402). For some embodiments that employ WRR scheduling scheme, such state variables include the index I and the round R. The designated location may be a register, a memory location, a specific position in a data structure, or any other appropriate software/hardware location from which the state variables may be stored and retrieved. The state variables read from the designated location are specific to the link currently available to receive data from the queues.

The state variables are then used to select a queue (404). The selected queue is then serviced (405). The available data in the queue are transferred from the selected queue to the link that is ready to receive data. Updated values are then calculated for the state variables of the scheduling process (406). The updated values will be used for the queue selection process the next time the same link is scheduled to receive data. The updated state variables are then stored (408). In some embodiments, the updated state variables are stored in the designated location from which the state variables are initially read. In some alternative embodiments, the updated state variables are stored to a different location that is offset from the designated location. The offset may be fixed or determined dynamically.

In this example, the updated state variables are then moved to another location in order to make the designated location available for the next queue selection operation (410). The state variables for the next link to be served are then loaded into a designated location (412). It should be noted that calculating and storing the updated state variable values do not necessarily have to occur prior to loading the state variables for the next link. In some embodiments, calculating and storing the values may occur concurrently with processing queues and/or loading the state variables for the next link, or after the queue has been processed and the state variables for the next link have been loaded. In one embodiment, step 412 may be repeated each time a scheduling decision is made. In some embodiments, the order of the steps of the process shown in FIG. 4 may vary, and in particular the order of steps 408, 410, and 412 may be different than the order shown in FIG. 4.

Figure 5A:
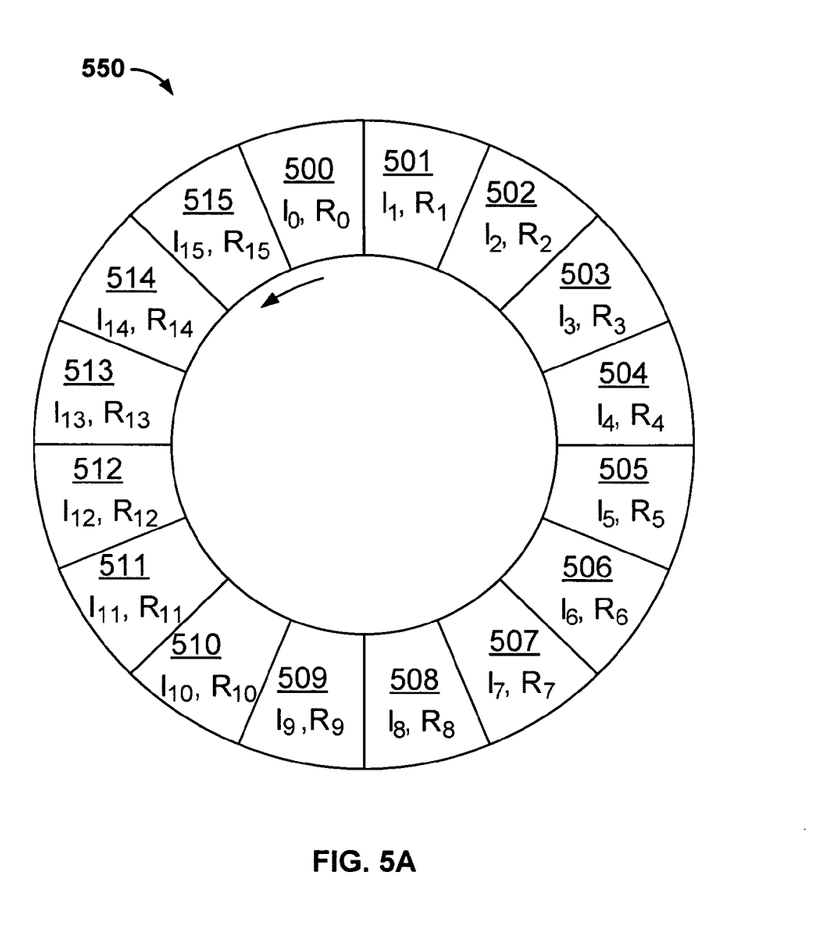
FIGS. 5A-5B are diagrams illustrating a data structure used by a queue scheduler according to one embodiment.
Figure 5B:
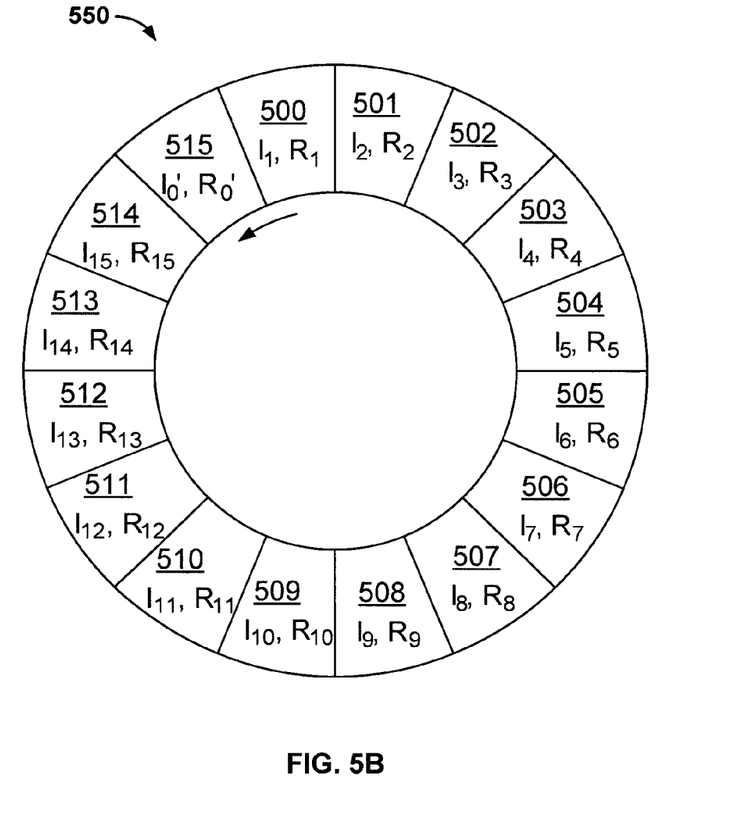

FIGS. 5A-5B are diagrams illustrating a data structure used by a queue scheduler according to one embodiment. In this example, there are sixteen links numbered 0-15 connected with the switch fabric. Sixteen sets of link specific state variables $I_i$ and $R_i$ are maintained, with subscript i ranging from 0-15, corresponding to links 0-15 respectively. The state variable sets are arranged in a ring 550. The ring includes 16 slots, labeled 500 through 515, and each slot stores a single I and R pair. The labeling of the slots is for the purpose of illustration only; the labels may vary in some embodiments or be omitted. The queue scheduler always reads the state variables from a designated location. In this example, the designated location is slot 500.

The ring is arranged in such a way that it may rotate. In some embodiments, the ring is implemented as a shift register. In the example shown, the ring rotates counter-clockwise so that the link specific variables associated with link 1 can shift to the slot previously occupied by the state variables associated with link 0, state variables associated with link 0 can shift to the slot next to it that previously stored the state variables associated with link 15, and so on. Clockwise shifting may also be used in some embodiments.

As shown in FIG. 5A, state variables $I_0$ and $R_0$ are currently stored in slot 500 and are used to determine the queue to be serviced by link 0. The ring configuration after the queue selection for link 0 has been made is shown in FIG. 5B. The ring rotates so that the state variables corresponding to link 1 are shifted into slot 500. Note that the state variables for link 0 are updated, and the updated values are represented as $I_0'$, $R_0'$. To service link 1, $I_1$ and $R_1$ are read from the designated slot 500 and used to determine which queue should be selected. Accordingly, the ring continues to rotate as links are scheduled to transfer data. Eventually the state variables corresponding to link 0 again shifts back to slot 500 and the cycle repeats.

In some embodiments, the updated state variable values may not be available to be stored in the designated slot 500 prior to the ring being advanced, e.g., to enable the selection process for link 1 to proceed if link 1 is ready to receive data before the updated state variable values have been calculated for link 0. In some such embodiments, the updated values for the state variable may be stored in the designated location after the ring has already advanced. In some such embodiments, the absolute position of the state variables for a particular link is not important so long as the relative position of each set of state variables with respect to the set of state variables that precede and follow it is maintained and/or known. In some embodiments, if the updated state variables become available sometime after the ring has already advanced, certain slot(s) in the ring that are not updated may be omitted. For example, after link 0 is scheduled, if the calculation for the link's state variables has a clock cycle delay that causes the states for link 0 to be updated when $I_0'$, $R_0'$ are positioned in slot 514 rather than 515, then slot 515 is not updated. In this example, slot 515 becomes part of the pipeline or logic used to calculate the new state values and is omitted from the ring.

In some embodiments, the queue scheduler is a dual mode queue scheduler. When operating in link-specific mode, ring 550 rotates and link specific information is obtained from the designated slot location 500, as described above. When operating in aggregate mode, ring 550 is locked in place and does not rotate. Each time a link becomes available for data transfer, the same I and R pair is read from slot 500 to determine which queue to select. The values for I and R are then updated and stored back to slot 500.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing access to a switch fabric, comprising:
   receiving an indication that a link included in a plurality of links to the switch fabric is next in order to be serviced by a queue scheduling process common to the plurality of links;
   determining a current value of each of one or more link-specific scheduling state variables specific to the link; and
   using the queue scheduling process common to the plurality of links and the link-specific scheduling state variables to determine a queue to be serviced by the link;
   wherein the queue scheduling process common to the plurality of links is configured to use for each of the plurality of a links a corresponding set of one or more link-specific scheduling state variables specific to that link, with the result that queues are selected for each respective link in the plurality of links, by the queue scheduling process common to them all, in a manner at least partly independent of each other link in the plurality.

2. A method of providing access to a switch fabric as recited in claim 1, wherein the plurality of queues are used to buffer data to be transferred to the switch fabric via the link.

3. A method of providing access to a switch fabric as recited in claim 1, wherein the switch fabric is a striped switch fabric.

4. A method of providing access to a switch fabric as recited in claim 1, wherein the switch fabric is a non-striped switch fabric.

5. A method of providing access to a switch fabric as recited in claim 1, wherein the link-specific scheduling state variables include an index (I) variable and a round (R) variable.

6. A method of providing access to a switch fabric as recited in claim 1, further comprising updating the scheduling state variables.

7. A method of providing access to a switch fabric as recited in claim 1, wherein determining the current value of each of one or more link-specific scheduling state variables specific to the link includes obtaining from a designated storage location the current value of each of the one or more link-specific scheduling state variables specific to the link.

8. A method of providing access to a switch fabric as recited in claim 7, wherein said designated storage location is one of a plurality of storage locations, and further comprising storing in each of said plurality of storage locations one or more scheduling state variables specific to a different one of said plurality of links.

9. A method of providing access to a switch fabric as recited in claim 8, wherein said plurality of storage locations are arranged in a ring and the method further comprises rotating the ring by shifting the data in each storage, so that the data stored in the designated location corresponds to a next link to be serviced.

10. A method of providing access to a switch fabric as recited in claim 9 further comprising updating the one or more scheduling state variables specific to the selected link.

11. A method of providing access to a switch fabric as recited in claim 1, wherein the queue scheduling process employs a weighted round robin (WRR) scheme.

12. A method of providing access to a switch fabric as recited in claim 1, wherein the queue scheduling process employs a weighted fair queueing (WFQ) scheme.

13. A method of providing access to a switch fabric as recited in claim 1, wherein the queue scheduling process employs a deficit round robin (DRR) scheme.

14. A method of providing access to a switch fabric as recited in claim 1, wherein the queue scheduling process employs a strict priority (SP) scheme.

15. A method of providing access to a switch fabric as recited in claim 1, wherein the queue scheduling process employs a round robin (RR) scheme.

16. A system for providing access to a switch fabric comprising:
   a buffer configured to store a plurality of queues; and
   a queue scheduler associated with the buffer and configured to:
      receive an indication that a link included in a plurality of links to the switch fabric is next in order to be serviced by the queue scheduler;
      determine a current value of each of one or more link-specific scheduling state variables specific to the link; and
      use the link-specific scheduling state variables to select one of the plurality of queues as the next queue to be serviced by the link;
      wherein the queue scheduler is common to a plurality of links and is configured to use for each of the plurality of a links a corresponding set of one or more link-specific scheduling state variables specific to that link, with the result that queues are selected for each respective link in the plurality of links, by the queue scheduler common to them all, in a manner at least partly independent of each other link in the plurality.

17. A computer readable medium comprising, a computer program product for providing access to a switch fabric, the computer program product comprising computer instructions which when executed perform the following:
   receiving an indication that a link included in a plurality of links to the switch fabric is next in order to be serviced by a queue scheduling process common to the plurality of links;

determining a current value of each of one or more link-specific scheduling state variables specific to the link; and using the queue scheduling process common to the plurality of links and the link-specific scheduling state variables to determine a queue to be serviced by the link;

wherein the queue scheduling process common to the plurality of links is configured to use for each of the plurality of a links a corresponding set of one or more link-specific scheduling state variables specific to that link, with the result that queues are selected for each respective link in the plurality of links, by the queue scheduling process common to them all, in a manner at least partly independent of each other link in the plurality.

* * * * *